(12) United States Patent
Jeong et al.

(10) Patent No.: US 9,549,432 B2
(45) Date of Patent: *Jan. 17, 2017

(54) METHOD AND USER EQUIPMENT APPARATUS FOR RADIO RESOURCE MANAGEMENT IN A MOBILE COMMUNICATION SYSTEM

(75) Inventors: Kyeong-In Jeong, Gyeonggi-do (KR); Soeng-Hun Kim, Gyeonggi-do (KR); Gert Jan Van Lieshout, Middlesex (GB)

(73) Assignee: Samsung Electronics Co., Ltd (KR)

( * ) Notice: Subject to any disclaimer, the term of this patent is extended or adjusted under 35 U.S.C. 154(b) by 43 days.

This patent is subject to a terminal disclaimer.

(21) Appl. No.: 13/336,393

(22) Filed: Dec. 23, 2011

(65) Prior Publication Data

US 2012/0093000 A1 Apr. 19, 2012

Related U.S. Application Data

(63) Continuation of application No. 12/112,388, filed on Apr. 30, 2008, now Pat. No. 8,315,194.

(30) Foreign Application Priority Data

May 2, 2007 (KR) .................. 10-2007-0042657

(51) Int. Cl.
*H04W 72/04* (2009.01)
*H04W 52/02* (2009.01)
(Continued)

(52) U.S. Cl.
CPC .......... *H04W 76/048* (2013.01); *H04L 5/0053* (2013.01); *H04L 5/0057* (2013.01);
(Continued)

(58) Field of Classification Search
None
See application file for complete search history.

(56) References Cited

U.S. PATENT DOCUMENTS 7,844,265 B2 11/2010 Kuchibhotla et al.
7,872,986 B2 * 1/2011 Chun et al. ................. 370/252
(Continued)

FOREIGN PATENT DOCUMENTS

CN 1567759 1/2005
JP 2006-217151 8/2006
(Continued)

OTHER PUBLICATIONS

R2-071419 "CQI reporting and resource allocation for CQI reporting w.r.t. DRX level" by IPWireless (hereinafter "IPWireless"), Mar. 2007.*
(Continued)

*Primary Examiner* — Robert C Scheibel
(74) *Attorney, Agent, or Firm* — The Farrell Law Firm, P.C.

(57) ABSTRACT

A method and apparatus are provided for transmitting uplink control information. A UE identifies a resource allocated for transmission of the uplink control information. The UE monitors a downlink transmission channel during an active time when a DRX is configured. The UE starts or restarts a timer when a downlink transmission occurs during the active time. The UE transmits the uplink control information via the identified resource when the timer is running.

6 Claims, 8 Drawing Sheets

(51) Int. Cl.
*H04W 76/04* (2009.01)
*H04L 5/00* (2006.01)
*H04W 76/06* (2009.01)

(52) U.S. Cl.
CPC ....... *H04L 5/0092* (2013.01); *H04W 52/0216* (2013.01); *H04W 76/068* (2013.01); *H04L 5/0037* (2013.01); *H04W 72/0413* (2013.01); *H04W 76/06* (2013.01)

(56) References Cited

U.S. PATENT DOCUMENTS

| | | |
|---|---|---|
| 2002/0064140 A1 | 5/2002 | Numminen |
| 2004/0087320 A1 | 5/2004 | Kim et al. |
| 2004/0103435 A1 | 5/2004 | Yi et al. |
| 2005/0141541 A1 | 6/2005 | Cuny et al. |
| 2005/0201296 A1 | 9/2005 | Vannithamby et al. |
| 2006/0171312 A1 | 8/2006 | Obuchi |
| 2006/0268788 A1 | 11/2006 | Harris et al. |
| 2008/0165698 A1 | 7/2008 | Dalsgaard et al. |
| 2008/0268863 A1 | 10/2008 | Pedersen et al. |
| 2009/0122736 A1 | 5/2009 | Damnjanovic et al. |
| 2009/0141701 A1 | 6/2009 | Dalsgaard |
| 2010/0157937 A1* | 6/2010 | Muharemovic et al. ..... 370/330 |
| 2010/0165853 A1 | 7/2010 | Iwamura et al. |

FOREIGN PATENT DOCUMENTS

| | | |
|---|---|---|
| KR | 1020030086172 | 11/2003 |
| KR | 1020060091660 | 8/2006 |
| RU | 2 262 196 | 10/2005 |
| WO | WO 2005/067172 | 7/2005 |
| WO | WO 2005/117299 | 12/2005 |
| WO | WO 2007/123346 | 11/2007 |

OTHER PUBLICATIONS

IPWireless, "CQI Reporting and Resource Allocation for CQI Preporting w.r.t. DRX Level", 3GPP TSG RAN WG2 #57bis, R2-071419, Mar. 30, 2007.
IPWireless: "DRX/DTX in RRC_Connected State", R2-070644, 3GPP TSG RAN WG2 #57, Feb. 9, 2007.
NEC: "Summary of Email Discussion on DRX Control", R2-071553, Apr. 2, 2007.
Samsung, "CQI Handling During DRX", 3GPP TSG-RAN Meeting #57bis, R2-071177, Mar. 30, 2007.
IP Wireless, "DRX Control in LTE_ACTIVE", R2-071503, 3GPP TSG RAN WG2 #57bis, Mar. 26-30, 2007.
NTT DoCoMo, Inc., "Views on DRX/DTX Control in LTE", R2-070279, 3GPP TSG RAN WG2 #56bis, Jan. 15-19, 2007.
European Search Report dated Oct. 15, 2014 issued in counterpart application No. 08008310.8-1857.

* cited by examiner

METHOD AND USER EQUIPMENT APPARATUS FOR RADIO RESOURCE MANAGEMENT IN A MOBILE COMMUNICATION SYSTEM

PRIORITY

This application in a Continuation Application of U.S. patent application Ser. No. 12/112,388, which claims priority under 35 U.S.C. §119(a) to an application filed in the Korean Industrial Property Office on May 2, 2007, and assigned Serial No. 2007-42657, the contents of which are hereby incorporated by reference.

BACKGROUND OF THE INVENTION

1. Field of the Invention

The present invention relates generally to a mobile communication system, and more particularly to a method for radio resource management for a User Equipment (UE).

2. Description of the Related Art

A Universal Mobile Telecommunication Service (UMTS) system is a $3^{rd}$ generation (3G) asynchronous mobile communication system, which uses wideband Code Division Multiple Access (CDMA) and is based on Global System for Mobile Communications (GSM) and General Packet Radio Services (GPRS), which are European mobile communication systems. In the third generation Partnership Project (3GPP), which is in charge of standardization of the UMTS, there is active discussion about a Long Term Evolution (LTE) system as a next generation mobile communication system. The LTE technology is targeting commercialization by 2010 and the realization of high speed packet-based communication at speeds of about 100 Mbps. Accordingly, various schemes are being discussed, which include a scheme of reducing the number of nodes located in communication paths by simplifying the structure of a network, and a scheme of approaching a wireless protocol to a wireless channel as closely as possible.

FIG. 1 illustrates an example of a structure of an evolved UMTS mobile communication system to which the present invention is applicable. Referring to FIG. 1, each of Evolved UMTS Radio Access Networks (E-RANs) 110 and 112 has a simplified 2 node structure, which includes Evolved Node Bs (ENBs) 120, 122, 124, 126, and 128 and anchor nodes (Enhanced Gateway General Packet Radio Service (GPRS) Support Nodes (EGGSNs)) 130 and 132. A User Equipment (UE) 101 is connected to an Internet Protocol (IP) network 114 through the E-RAN 110 or 112. The ENBs 120 to 128 correspond to legacy Node Bs of the UMTS system and are connected to the UE 101 through a wireless channel. However, different from legacy Node Bs, the ENBs 120 to 128 perform more complicated functions. In the LTE, all user traffic including the real-time service, such as Voice over IP (VoIP) using the Internet protocol, are provided through a shared channel. Therefore, the LTE requires an apparatus for collecting status information of UEs and performing scheduling using the collected information. The ENBs 120 to 128 control the scheduling. Usually, one ENB controls a plurality of cells. Further, the ENB performs Adaptive Modulation and Coding (AMC), which determines a modulation scheme and a channel coding rate in accordance with the channel status of a UE. As in the High Speed Uplink Packet Access (HSUPA), which is also called "Enhanced Dedicated Channel (E-DHC)", and the High Speed Downlink Packet Access (HSDPA) of the UMTS, the Hybrid Automatic Repeat Request (HARQ) is performed between the ENBs 120 to 128 and the UE 101 in the LTE also. The HARQ process soft-combines previously-received data with retransmitted data without discarding the previously-received data, thereby improving the ratio of success in the reception. The HARQ process improves the transmission efficiency in the high speed packet communication, such as the High Speed Downlink Packet Access (HSDPA) and the Enhanced Dedicated Channel (EDCH). In order to implement a maximum transmission speed of 100 Mbps, the LTE is expected to use Orthogonal Frequency Division Multiplexing (OFDM) in 20 MHz bandwidth as wireless connection technology. However, because it is impossible for only the HARQ to satisfy requirements for various Qualities of Service (QoSs), an outer Automatic Repeat Request (ARQ) in a higher layer may be performed between the UE 101 and the ENBs 120 to 128.

In the wireless communication as described above, degradation in the quality of a high quality data service is caused mainly by the channel environment. The channel environment in the wireless communication frequently changes due to interference by multi-path signals or other users, Doppler Effect due to movement and frequent speed change of a User Equipment (UE), shadowing, change in the power of a received signal caused by the fading as well as the Additive White Gaussian Noise (AWGN), etc. One of the main schemes used to overcome the fading in a typical OFDM system is the Adaptive Modulation and Coding (AMC) scheme. According to the AMC scheme, the modulation scheme and the coding scheme are adaptively controlled according to channel change in a downlink (DL).

In order to apply power control or an AMC scheme according to the channel change to a DL channel, a UE must report Channel Quality Information (CQI) of a received downlink signal to the ENB. Usually, it is possible to detect the CQI by measuring a Signal to Noise Ratio (SNR) of a received signal by a UE. Upon receiving the CQI from the UE, the ENB can acquire the information on the downlink channel state of the UE and can set a corresponding modulation scheme and a corresponding coding scheme or control the power based on the acquired DL channel state information. In contrast, in order to apply the power control or AMC scheme according to the channel change to the UL channel, the UE must transmit a pilot signal (also called a "Reference Signal (RS)") with a predetermined pattern in an uplink. Hereinafter, such a UL pilot signal is called a "sounding." The ENB can measure the uplink channel state through a received sounding and can set a corresponding modulation scheme and a corresponding coding scheme or control the power based on the measured uplink channel state.

The CQI, sounding, or a response information, such as an Acknowledgement/Negative Acknowledgement (ACK/NACK), on an uplink HARQ in response to transmission of a downlink HARQ is commonly referred to as "uplink control information".

FIG. 2 illustrates an example of a Discontinuous Reception (DRX) operation of a UE that is in a Radio Resource Control (RRC)-connected mode.

In the 3rd Generation Partnership Project (3GPP), radio modes of a UE in the 3GPP LTE system are classified largely into an RRC idle mode and an RRC connected mode. Definitions of the RRC idle mode and the RRC connected mode are based on 3GPP TS36.300.

In general, the RRC idle mode refers to a state of a UE, in which the ENB does not have information of Radio Bearer (RB) context and UE context, and an anchor node has the context information of the UE and manages the location of the UE according to each Tracking Area (TA) for paging, instead of managing the location cell by cell. Further, the RRC connected mode refers to a state of a UE, in which not only an anchor node, but also the ENB has information of RB context and UE context (a possibility that the information may include service context information is not excluded). An RRC connection is established between the UE and the ENB, so that it is possible to manage the location of the UE cell by cell. Usually, in order to receive and/or transmit data for a particular service, UEs in an RRC idle mode must first establish an RRC connection to the ENB and report UE context information to the ENB, and then establish a signaling connection to an anchor node and report UE context and service context information to the anchor node. However, UEs in an RRC connected mode can be allocated corresponding radio resources directly from the ENB and then receive and/or transmit data for a particular service through the resources.

The DRX operation minimizes power consumption of a UE through discontinuous reception of channels only at particular periods, instead of continuously consuming power through continuous reception of channels, when it is unnecessary to continuously transmit data to the UE. The DRX usually includes the following elements.

Active Period: a period in which a receiver of a UE is on, or a period in which reception of data of a corresponding service is expected when discontinuous reception has been set for each service.

Sleep Period: a period in which a receiver of a UE is off, or a period in which reception of data of a corresponding service is not expected when discontinuous reception has been set for each service. If the UE receiver is off is determined by the sleep period overlapping an active period of another service.

Discontinuous Reception Period (DRX cycle length; 210 & 220): a period or length between active periods.

Although FIG. 2 illustrates active periods having the same length, the active periods starting from the points 205, 215, and 225 may have different lengths.

When a UE is in a discontinuous reception mode as described above, uplink control information may not be required as much as in a continuous reception mode. For example, if a radio resource allocated in a continuous reception mode in order to transmit CQI frequently overlaps with a sleep period in a discontinuous reception mode, it is not desirable in view of the power consumption of a UE to transmit multiple CQIs or transmit CQI multiple times in the sleep period. Further, because downlink transmission does not occur in the sleep period, the multiple CQIs are not actually used. Further, even though the UE does not actually perform the transmission of the multiple CQIs, the radio resources for transmission of the CQI or CQIs have already been allocated, which results in a waste of radio resources.

Therefore, it is necessary to reconfigure uplink control information transmission resources, which have been allocated in a previous continuous or discontinuous reception mode, when a UE enters a new discontinuous reception mode. Accordingly, it is necessary to perform an explicit reconfiguration procedure through an RRC message, which may cause a signaling overhead.

SUMMARY OF THE INVENTION

The present invention has been made to address at least the above problems and disadvantages and to provide at least the advantages described below. Accordingly, an aspect of the present invention provides a method and apparatus for transmitting uplink control information.

In accordance with an aspect of the present invention, a method is provided for transmitting uplink control information. A UE identifies a resource allocated for transmission of the uplink control information. The UE monitors a downlink transmission channel during an active time when a DRX is configured. The UE starts or restarts a timer when a downlink transmission occurs during the active time. The UE transmits the uplink control information via the identified resource when the timer is running.

In accordance with another aspect of the present invention, an apparatus is provided for transmitting uplink control information. The apparatus includes a control information generation unit for generating uplink control information. The apparatus also includes a timer that is started or restarted, by the UE, when a downlink transmission occurs during an active time when a DRX is configured. The apparatus further includes a transmitter/receiver for identifying a resource allocated for transmission of the uplink control information, for monitoring a downlink transmission channel during the active time, and for transmitting the uplink control information via the identified resource when the timer is running.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention will be described with reference to the accompanying drawings. In the following description, a detailed description of known functions and configurations incorporated herein will be omitted when it may make the subject matter of the present invention rather unclear. Further, various specific definitions found in the following description are provided only to help general understanding of the present invention, and it is apparent to those skilled in the art that the present invention can be implemented without such definitions.

According to the first embodiment of the present invention, when a UE enters a discontinuous reception mode having a new discontinuous reception period from a continuous reception mode or a discontinuous reception mode, the UE compares the new discontinuous reception period with a discontinuous reception period threshold established in advance between the UE and an ENB. When the new discontinuous reception period is larger than or equal to the discontinuous reception period threshold, the UE and the ENB implicitly release radio resources for uplink control information transmission having been allocated in the previous continuous or discontinuous mode. Upon recognizing the implicit release of the radio resources for uplink control information transmission, the UE stops transmitting the uplink control information using the radio resources. The discontinuous reception period threshold may be established in advance between the UE and the ENB through signaling dedicated for the UE, through system information broadcasted within the cell, or by being hard-coded into one fixed value.

Figure 1:
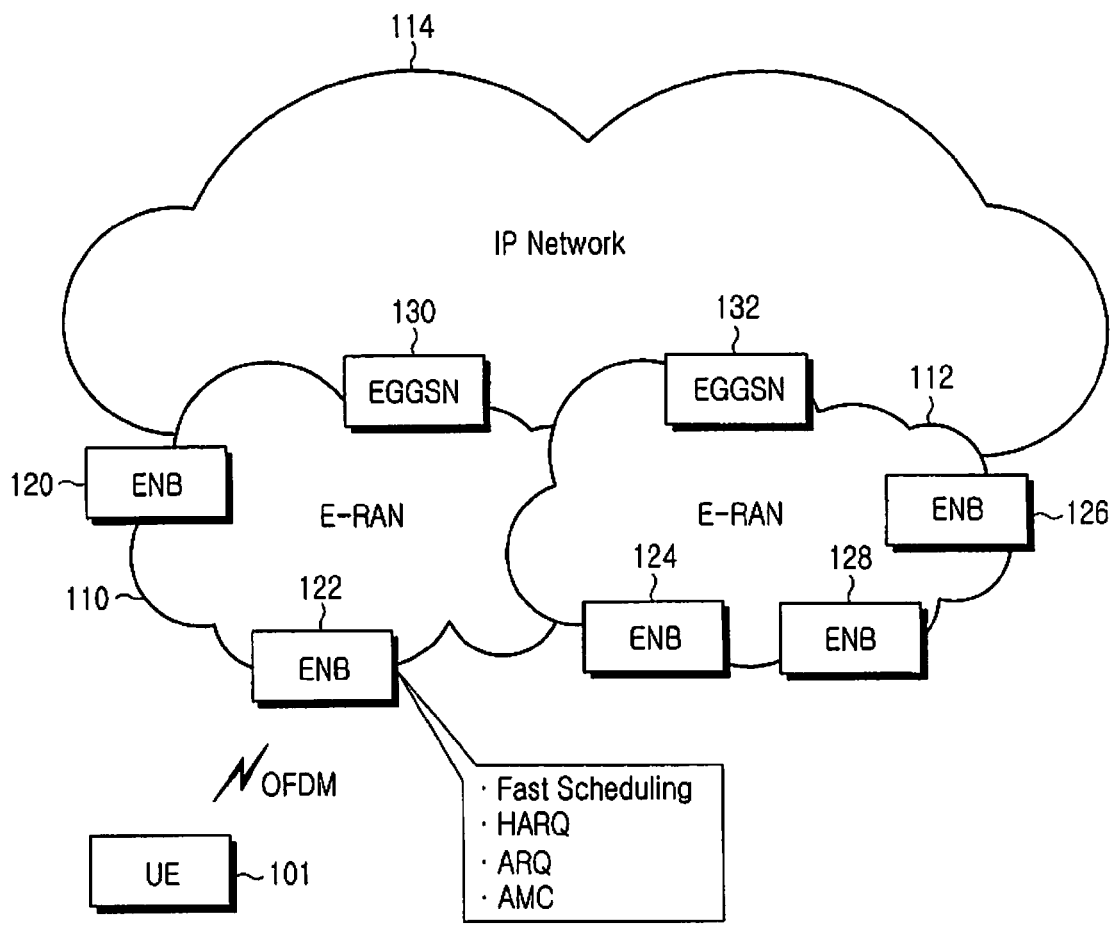
FIG. 1 illustrates an example of a structure of an evolved UMTS mobile communication system to which the present invention is applicable.
Figure 2:
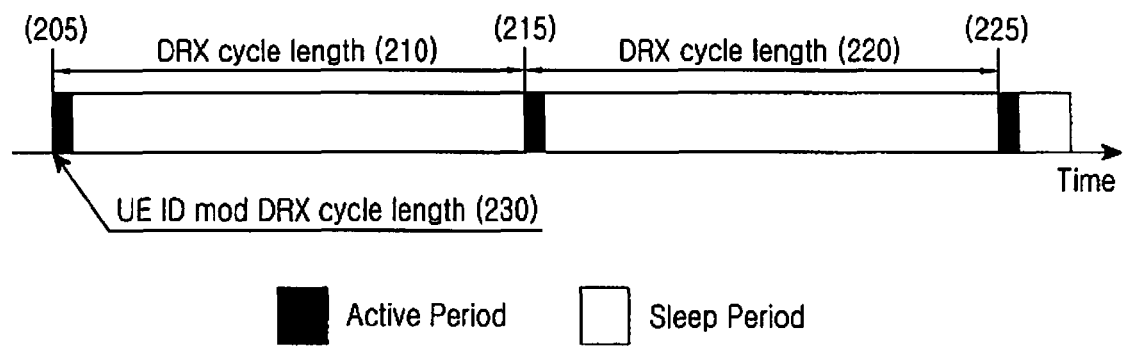
FIG. 2 illustrates an example of a DRX operation of a UE in an RRC-connected mode.
Figure 3:
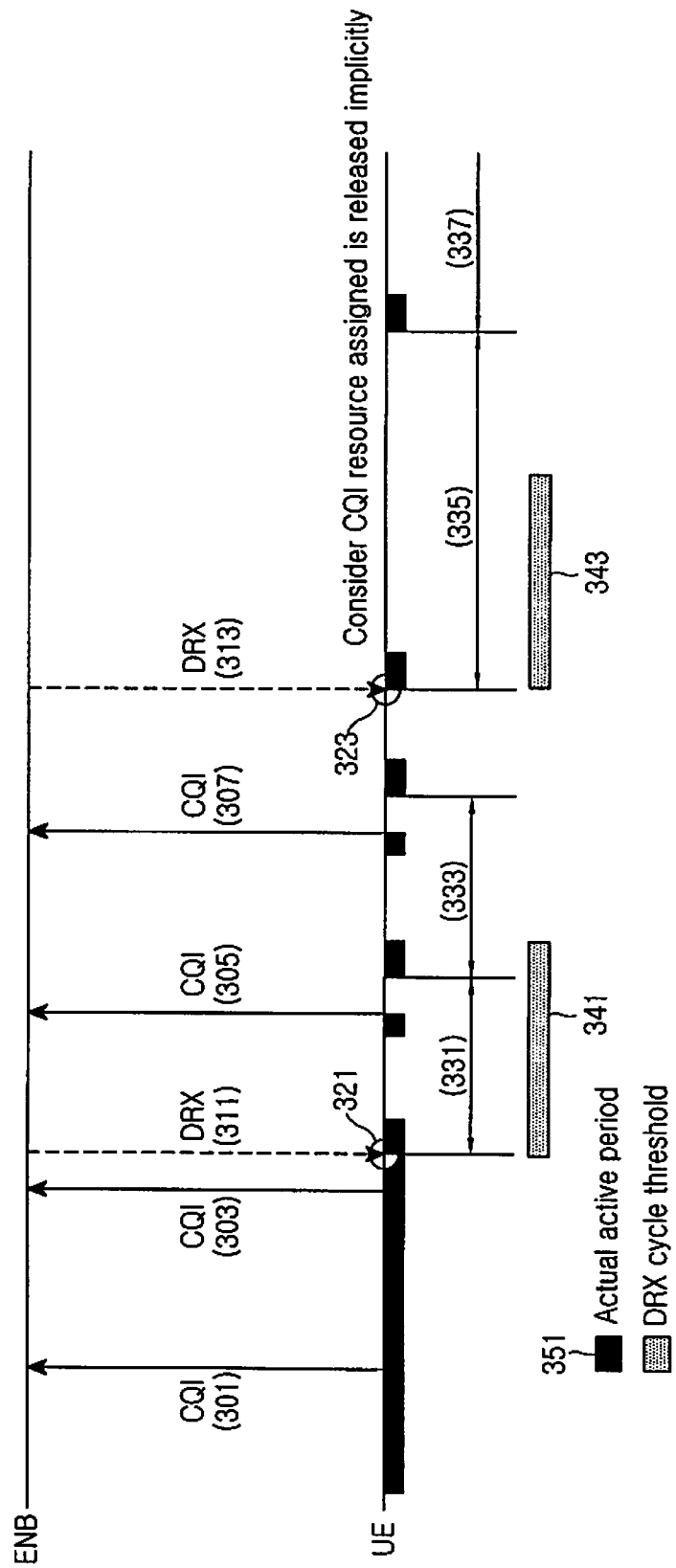
FIG. 3 illustrates a method for implicit release of uplink control information transmission resources of a UE operating in both a DRX mode and an RRC-connected mode according to a first embodiment of the present invention.

FIG. 3 illustrates a method for implicit release of uplink control information transmission resources of a UE operating in both a discontinuous reception mode and an RRC connected mode according to the first embodiment of the present invention. Although FIG. 3 utilizes CQI as an example of the uplink control information, the present invention is also applicable to other types of uplink control information. For example, the uplink control information may include an uplink ACK/NACK in response to a downlink transmission, sounding, etc.

Referring to FIGS. 3, 301 and 303 indicate transmission of CQI through radio resources for CQI having been allocated for a UE operating in a continuous reception mode. At the time point 321, if a UE starts to operate in a discontinuous reception mode having discontinuous reception periods 331 and 333 according to a predetermined rule or through an explicit signaling of 311, the UE compares the new discontinuous reception periods 331 and 333 with a discontinuous reception period threshold 341 established in advance between the UE and the ENB. In FIG. 3, because the discontinuous reception period threshold 341 is larger than the actual discontinuous reception periods 331 and 333, the UE considers that the radio resources for CQI transmission having been allocated before the UE enters the discontinuous reception mode 321 are still valid, and transmits CQI using a corresponding radio resource of corresponding timing.

At the time point 323, if the UE starts to operate in a discontinuous reception mode having discontinuous reception periods 335 and 337 according to a predetermined rule or through an explicit signaling of 313, the UE compares the new discontinuous reception periods 335 and 337 with a discontinuous reception period threshold 343 established in advance between the UE and the ENB. At this time, because the discontinuous reception period threshold 343 is smaller than the actual discontinuous reception periods 335 and 337, the UE considers that the radio resources for CQI transmission used before the UE enters the current discontinuous reception mode have been already released, and stops transmitting CQI through a corresponding radio resource of corresponding timing.

Further, when the ENB has detected, through an explicit signaling 313 or according to a predetermined rule, that the UE has entered a new discontinuous reception mode 323, the ENB recognizes that the discontinuous reception period threshold 343 pre-established between the UE and the ENB is smaller than the actual discontinuous reception periods 335 and 337, and considers that the radio resources for CQI transmission having been allocated before the UE enters the discontinuous reception mode 323 are not available any more. Therefore, the ENB can release the radio resources and re-allocate the radio resources for another UE.

As indicated above, the discontinuous reception period thresholds 341 and 343 may be established in advance between the UE and the ENB through signaling dedicated for the UE, through system information broadcasted within the cell, or by being hard-coded into one fixed value.

Figure 4:
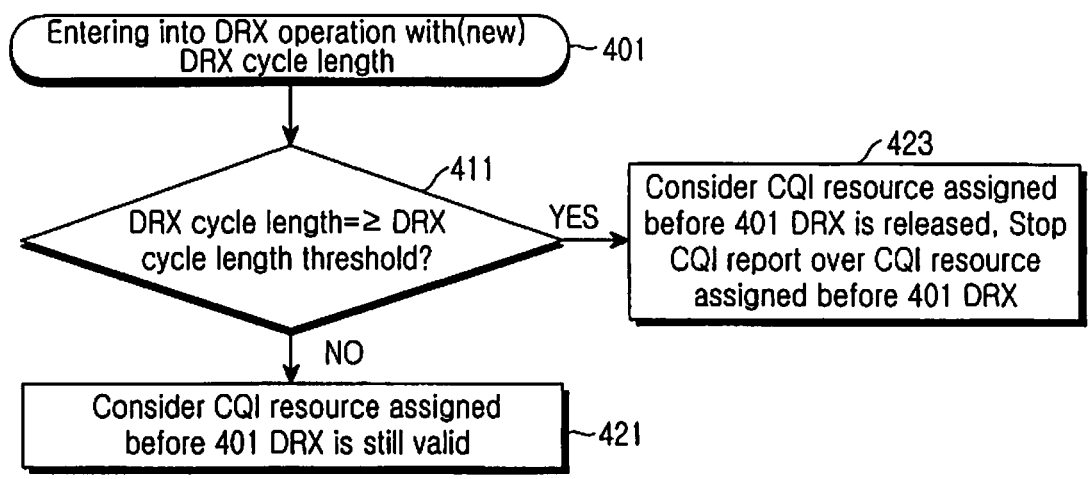
FIG. 4 is a flow diagram illustrating an operation of a UE according to the first embodiment of the present invention.

FIG. 4 is a flow diagram illustrating an operation of a UE according to the first embodiment of the present invention. Referring to FIG. 4, in step 401, the UE enters a discontinuous reception mode having a new DRX cycle length. Then, in step 411, the UE compares a discontinuous reception period of the discontinuous reception mode started in step 401 with the discontinuous reception period threshold pre-established between the UE and the ENB.

As a result of the comparison in step 411, if the new discontinuous reception period is smaller than the discontinuous reception period threshold, in step 421, the UE considers that the radio resources for transmission of CQI allocated before entering the discontinuous reception mode started in step 401 is still valid. However, as a result of the comparison in step 411, if the new discontinuous reception period is larger than or equal to the discontinuous reception period threshold, in step 423, the UE considers that the radio resources for transmission of CQI allocated before entering the discontinuous reception mode started in step 401 have been released, and stops transmitting the CQI through the radio resources.

Figure 5:
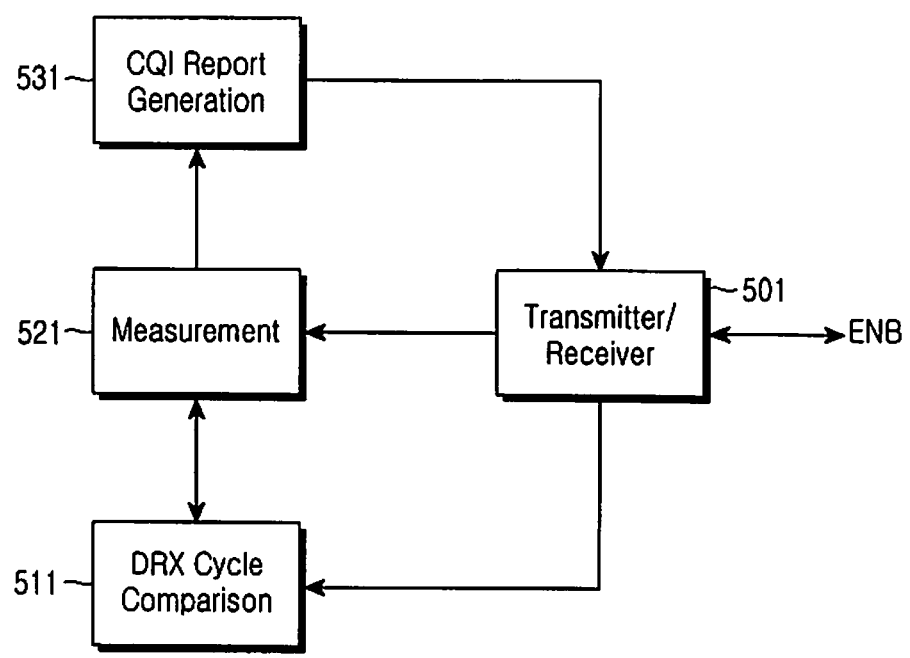
FIG. 5 is a block diagram of a UE according to the first embodiment of the present invention.

FIG. 5 is a block diagram of a UE according to the first embodiment of the present invention. Referring to FIG. 5, a transmitter/receiver 501 performs transmission/reception of a signal to/from an ENB. If the UE enters a discontinuous reception mode having a new discontinuous reception period through an explicit signaling or by a predetermined rule, a DRX cycle comparison unit 511 compares the new discontinuous reception period with a discontinuous reception period threshold. Based on a result of the comparison by the DRX cycle comparison unit 511, if the previously allocated radio resources for CQI transmission is determined as valid in the new discontinuous reception mode also, the measurement unit 521 performs measurement of a downlink pilot channel, the CQI report generation unit 531 generates CQI from a value measured by the measurement unit 521, and the transmitter/receiver 501 transmits the generated CQI to the ENB while using the radio resources for CQI transmission allocated before the discontinuous reception as they are.

According to the second embodiment of the present invention, a length of an inactivity period is compared with an inactivity period threshold established in advance between the UE and the ENB. When the new inactivity period is larger than or equal to the inactivity period threshold, the UE and the ENB implicitly release radio resources for uplink control information transmission having been allocated in the previous continuous or discontinuous mode. Upon recognizing the implicit release of the radio resources for uplink control information transmission, the UE stops transmitting the uplink control information using the radio resources. The inactivity period threshold may be pre-established between the UE and the ENB through signaling dedicated for the UE, through system information broadcasted within the cell, or by being hard-coded into one fixed value.

Figure 6:
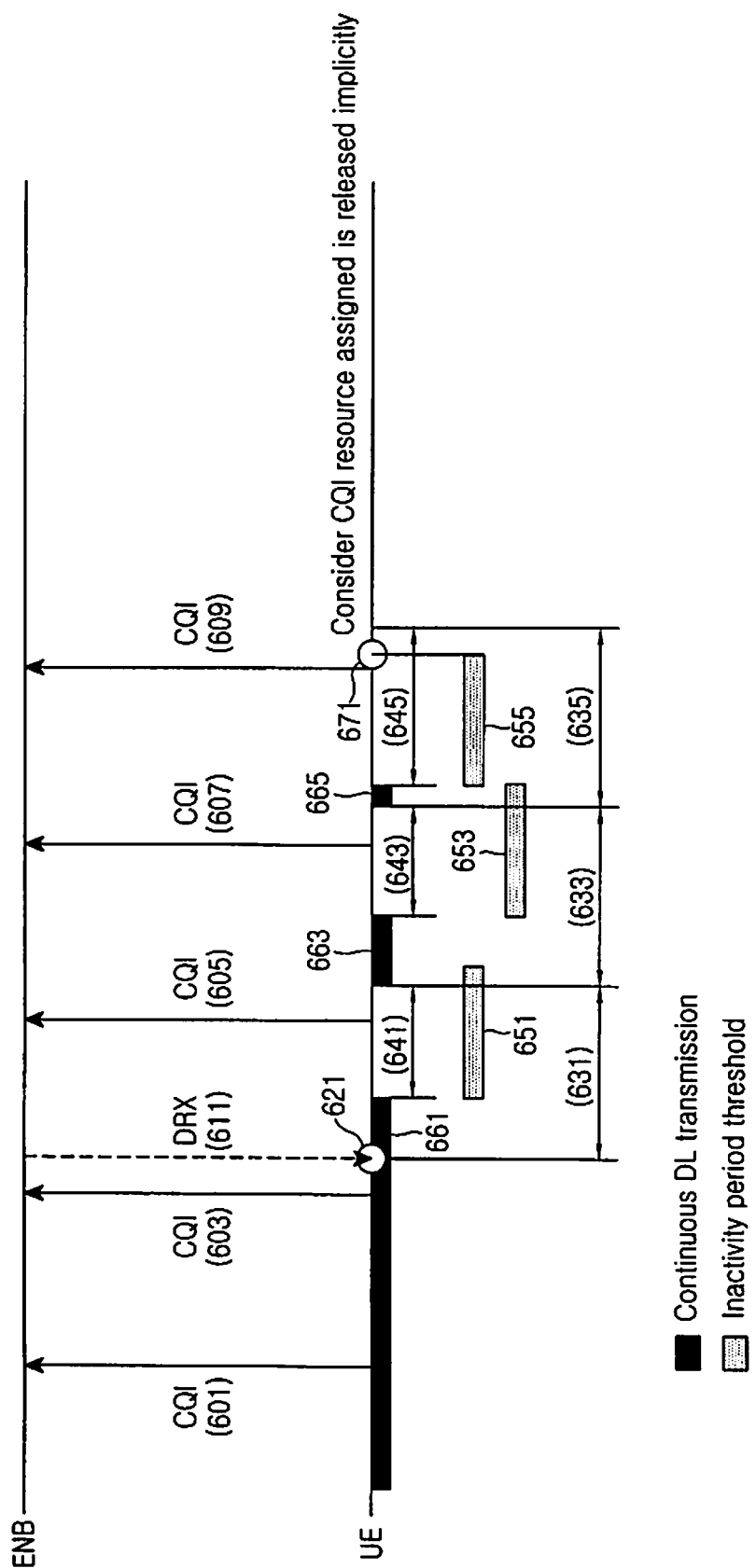
FIG. 6 illustrates a method for implicit release of uplink control information transmission resources of a UE operating in both a DRX mode and an RRC connected mode according to a second embodiment of the present invention.

FIG. 6 illustrates a method for implicit release of uplink control information transmission resources of a UE operating in both a discontinuous reception mode and an RRC connected mode according to the second embodiment of the present invention. Although FIG. 6 utilizes CQI as an example of the uplink control information, the present invention is also applicable to other types of uplink control information. For example, the uplink control information may include an uplink ACK/NACK in response to a downlink transmission, sounding, etc.

Referring to FIGS. 6, 601 and 603 indicate transmission of CQI by an ENB through radio resources for CQI having been allocated for a UE operating in a continuous reception mode. At the time point 621, if a UE starts to operate in a discontinuous reception mode having discontinuous reception periods 631, 633, and 635 according to a predetermined rule or through an explicit signaling of 611, the UE triggers a timer for a downlink inactivity period pre-established between the UE and the ENB. While the UE operates in the discontinuous reception mode, the timer is repeatedly restarted whenever there is a new downlink transmission. Reference numerals 651, 653, and 655 indicate periods in which the timer is operated for a final downlink transmission during each discontinuous reception mode.

The timer restarted at the final downlink transmission in the discontinuous reception mode 661 is restarted again at the first downlink transmission in the discontinuous reception mode 663 due to the beginning of the new discontinuous reception mode 663 before expiration of the timer operation period 651. That is, at the starting point of the discontinuous reception mode 663, because the timer restarted at the final downlink transmission of the discontinuous reception mode 661 has not expired yet, the UE considers that the radio resource for CQI transmission allocated in the continuous reception mode are still valid, and transmits the CQI by using corresponding radio resources of corresponding timing (605).

Further, in the discontinuous reception mode 663 also, the timer is restarted whenever there is downlink transmission. Also, the timer restarted by the final downlink transmission of the discontinuous reception mode 663 is restarted again by the first downlink transmission of the discontinuous reception mode 665 before the timer operation period 653 expires. At the starting point of the discontinuous reception mode 665 also, because the timer has not expired yet, the UE considers that the radio resources for CQI transmission allocated in the continuous reception mode are still valid, and transmits the CQI (607).

The timer restarted by the final downlink transmission of the discontinuous reception mode 665 expires at the end point 671 of the timer operation period 655 before reception of the first downlink transmission of the next discontinuous reception mode. When the timer expires at the point 671, the UE considers that the radio resources for CQI transmission having been allocated in the continuous reception mode have been released, and stops transmitting the CQI through corresponding radio resources.

The CQI transmission 609 precedes the time point 671 at which the timer operation period expires. Therefore, the UE can transmit the CQI through the radio resources allocated in the continuous reception operation. Further, after the time point 671, the ENB can re-allocate the radio resources allocated in the continuous reception operation, in order to transmit uplink control information of another UE.

Although FIG. 6 illustrates use of an inactivity period threshold (timer) for downlink transmission, it is also possible according to the second embodiment of the present invention to employ a method of comparing a length of an inactivity period for uplink transmission or downlink and uplink transmission with an inactivity period threshold (timer) and then implicitly releasing radio resources for uplink control information transmission having been allocated in the continuous reception operation. According to the method, the timer is restarted whenever the uplink transmission occurs or whenever one of downlink transmission or uplink transmission occurs.

Figure 7:
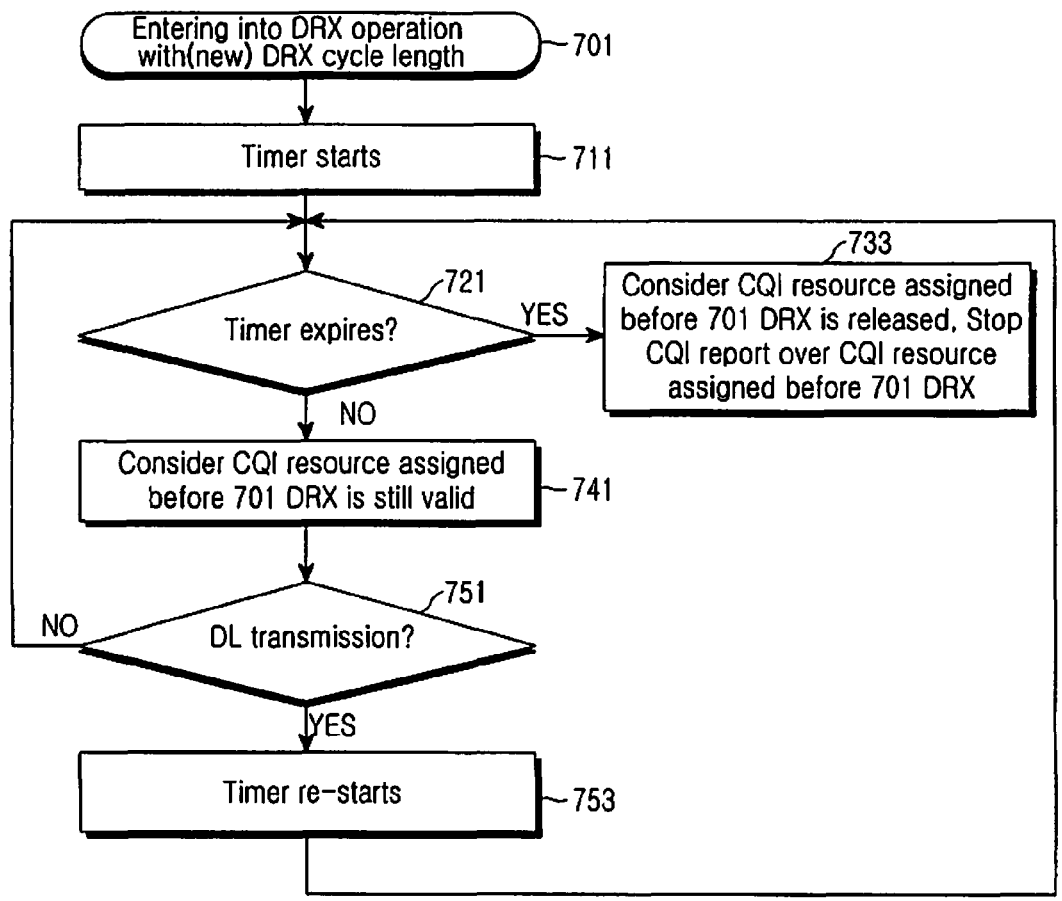
FIG. 7 is a flow diagram illustrating an operation of a UE according to the second embodiment of the present invention.

FIG. 7 is a flow diagram illustrating an operation of a UE according to the second embodiment of the present invention. Referring to FIG. 7, in step 701, the UE enters a discontinuous reception mode. Then, in step 711, the UE triggers a timer indicating an inactivity period threshold for downlink transmission. The timer is pre-established between the UE and the ENB through signaling dedicated for the UE, through system information broadcasted within the cell, or by being hard-coded into one fixed value. In step 721, it is determined if the timer has expired. When the timer has not expired, in step 741, the UE considers that the radio resources for transmission of CQI allocated before entering the discontinuous reception mode started in step 701 is still valid, and transmits the CQI through the radio resources until the timer expires. In step 751, the UE determines if a new downlink transmission occurs. When a new downlink transmission does not occur, the UE returns to step 721. However, if a new downlink transmission occurs before the timer expires, the UE restarts the timer in step 753.

As a result of the comparison in step 721, if the timer has expired, in step 733, the UE considers that the radio resources for transmission of CQI allocated before entering the discontinuous reception mode started in step 701 have been released and stops transmitting the CQI through the radio resources.

Figure 8:
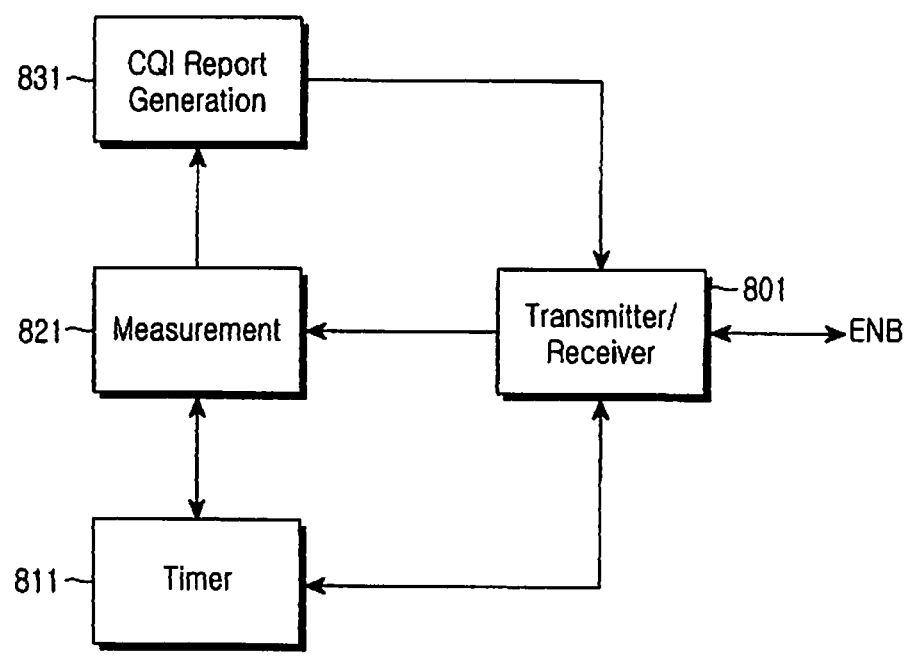
FIG. 8 is a block diagram of a UE according to the second embodiment of the present invention.

FIG. 8 is a block diagram of a UE according to the second embodiment of the present invention. Referring to FIG. 8, a transmitter/receiver 801 performs transmission/reception of a signal to/from an ENB. If the UE enters a discontinuous reception mode having a new discontinuous reception period through an explicit signaling or by a predetermined rule, the timer 811 indicating an inactivity period threshold for downlink transmission starts. The timer 811 is restarted whenever downlink transmission occurs through the transmitter/receiver 801. The measurement unit 821 performs measurement of a downlink pilot channel based on an assumption that the radio resources for CQI transmission allocated before entering the discontinuous mode are valid, before the timer 811 expires. The CQI report generation unit 831 generates CQI from a value measured by the measurement unit 821, and the transmitter/receiver 801 transmits the generated CQI to the ENB using the radio resources for CQI transmission allocated before the discontinuous reception as they are. When the timer has expired, the transmitter/receiver 801 considers that the radio resources for CQI transmission allocated before entering the discontinuous reception mode have been released, and stops transmitting CQI through the radio resources.

According to the present invention, when a discontinuous reception period or an inactivity period of a UE exceeds a threshold, an ENB releases resources for uplink control information transmission having been allocated to the UE, and the UE recognizes the release of the resources and stops transmitting control information through the resources. As a result, the present invention reduces the explicit reconfiguration procedure through an RRC message, which is otherwise necessary whenever the UE enters a new discontinuous reception mode.

While the present invention has been shown and described with reference to certain exemplary embodiments thereof, it will be understood by those skilled in the art that various changes in form and details may be made therein without departing from the spirit and scope of the present invention as defined by the appended claims.

What is claimed is:

1. A method for transmitting uplink control information, the method comprising the steps of:
   identifying, by a User Equipment (UE), a resource allocated for transmission of the uplink control information;
   monitoring, by the UE, a downlink transmission channel during an active time when a Discontinuous Reception (DRX) is configured;
   starting or restarting, by the UE, a timer when an indication of new downlink or new uplink data transmission is received during the active time; and
   transmitting, by the UE, the uplink control information via the identified resource when the timer is running.

2. The method of claim 1, wherein the uplink control information comprises Channel Quality Information (CQI).

3. The method of claim 1, wherein the uplink control information comprises a sounding.

4. An apparatus for transmitting uplink control information, comprising:
   a control information generation unit for generating uplink control information;
   a timer that is started or restarted, by a User Equipment (UE), when an indication of new downlink or new uplink data transmission is received during an active time when a Discontinuous Reception (DRX) is configured;
   a transmitter/receiver for identifying a resource allocated for transmission of the uplink control information, for monitoring a downlink transmission channel during the active time, and for transmitting the uplink control information via the identified resource when the timer is running.

5. The apparatus of claim 4, wherein the uplink control information comprises Channel Quality Information (CQI).

6. The apparatus of claim 4, wherein the uplink control information comprises a sounding.

* * * * *